(12) United States Patent
Tsutsumi

(10) Patent No.: US 8,705,099 B2
(45) Date of Patent: Apr. 22, 2014

(54) INFORMATION PROCESSING APPARATUS CONNECTABLE TO A SERVER AND A PRINTER

(75) Inventor: Kensuke Tsutsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 13/234,152

(22) Filed: Sep. 16, 2011

(65) Prior Publication Data

US 2012/0105908 A1    May 3, 2012

(30) Foreign Application Priority Data

Oct. 29, 2010  (JP) .................................. 2010-244288

(51) Int. Cl.
  *G06F 3/12*    (2006.01)
  *G06K 15/00*   (2006.01)
(52) U.S. Cl.
  USPC ....... 358/1.15; 358/1.14; 358/1.16; 358/1.17; 358/1.13; 710/52; 714/48
(58) Field of Classification Search
  USPC ............... 358/1.13, 1.14, 1.15, 1.16, 1.17; 709/203, 224, 227; 370/252, 429
  See application file for complete search history.

(56) References Cited

U.S. PATENT DOCUMENTS

| | | | |
|---|---|---|---|
| 6,665,088 B1 * | 12/2003 | Chiba et al. ................. | 358/1.17 |
| 7,417,956 B2 * | 8/2008 | Nakazawa .................... | 370/252 |
| 8,339,629 B2 * | 12/2012 | Maki ............................ | 358/1.14 |
| 2001/0015819 A1 * | 8/2001 | Toyoda et al. ............... | 358/1.15 |
| 2002/0044299 A1 * | 4/2002 | Iwase et al. .................. | 358/1.15 |
| 2005/0254456 A1 * | 11/2005 | Sakai et al. ................... | 370/328 |
| 2006/0015660 A1 | 1/2006 | Nguyen et al. | |
| 2006/0017964 A1 * | 1/2006 | Maki ............................ | 358/1.15 |
| 2006/0262335 A1 | 11/2006 | Varga | |
| 2008/0270643 A1 * | 10/2008 | Tashiro ......................... | 710/35 |
| 2010/0103453 A1 * | 4/2010 | Tsutsumi ..................... | 358/1.15 |
| 2010/0110475 A1 * | 5/2010 | Johnson et al. .............. | 358/1.15 |
| 2010/0208298 A1 | 8/2010 | Kitagata | |
| 2012/0159265 A1 * | 6/2012 | Nishita et al. ................ | 714/49 |

FOREIGN PATENT DOCUMENTS

| | | | |
|---|---|---|---|
| JP | 2000-168175 A | 6/2000 | |
| JP | 2007-272833 A | 10/2007 | |

OTHER PUBLICATIONS

European Search Report dated Jul. 1, 2013 issued in corresponding European Patent Appln. No. 11007696.5.
Korean Office Action dated Dec. 10, 2013 issued in corresponding Korean Patent Application No. 10-2011-0108196.

* cited by examiner

*Primary Examiner* — Twyler Haskins
*Assistant Examiner* — Dennis Dicker
(74) *Attorney, Agent, or Firm* — Fitzpatrick, Cella, Harper & Scinto

(57) ABSTRACT

An information processing apparatus connectable to a server which manages print data, and a printer which prints based on the print data receives the print data from the server, and transfers the received print data to the printer by each first data size. When a disconnection between the server and the information processing apparatus is detected, the information processing apparatus transfers the print data to the printer by each second data size smaller than the first data size.

7 Claims, 13 Drawing Sheets

INFORMATION PROCESSING APPARATUS CONNECTABLE TO A SERVER AND A PRINTER

BACKGROUND OF THE INVENTION

1. Field of the Invention

The present invention relates to an information processing apparatus which acquires print data from a server and performs print processing, a print data processing method in the information processing apparatus, and a storage medium storing a program thereof.

2. Description of the Related Art

Recently, cloud services are coming into practice and lay open print servers as print service functions on the Internet. By installing print servers in a large-scale data center, cloud services need not manage hardware for each customer and can easily add resources in accordance with the server load. The use of cloud services requires an environment where a pull print function is performed to acquire print data by a printer from a print server via the Internet, transfer it to the printer, and print. In general, a printing system needs to quicken first printing and start printing without keeping the user waiting. In terms of this, the pull print system can quicken first printing by transferring print data to the printer after acquiring it.

However, the Internet line is narrow, and network disconnections frequently occur during transfer of print data to a printer. When the network is disconnected during transfer of print data, the printer has already started printing the print data and has discharged paper halfway. Japanese Patent Laid-Open No. 2007-272833 discloses a method of holding the number of a page which has been completely printed by a printer, and in reconnection after network disconnection, notifying a client of the printing completion page number. The client can know the printing completion page and print from a page which has not been discharged yet.

However, even if a discharged page is notified upon generation of a print error and the remaining pages which have not been discharged yet are to be printed again, as described in Japanese Patent Laid-Open No. 2007-272833, the print job having the print error and a re-print job starting from an intermediate page are handled as different print jobs. Another print job may be interrupted before re-printing, prolonging the total time of desired print processing.

SUMMARY OF THE INVENTION

An aspect of the present invention is to eliminate the above-mentioned problems with conventional technology. The present invention provides an information processing apparatus which prevents generation of a print error when a disconnection of a network line is detected, a print data processing method in the information processing apparatus, and a storage medium storing a program thereof.

The present invention in its first aspect provides an information processing apparatus connectable to a server which manages print data, and a printer which prints based on the print data, comprising: a reception unit configured to receive the print data from the server; a transfer control unit configured to transfer the print data received by the reception unit to the printer by each first data size; and a detection unit configured to detect a disconnection between the server and the information processing apparatus, wherein when the detection unit detects the disconnection, the transfer control unit transfers the print data to the printer by each second data size smaller than the first data size.

The present invention in its second aspect provides a print data processing method executed in an information processing apparatus connectable to a server which manages print data, and a printer which prints based on the print data, comprising: a reception step of receiving the print data from the server; a transfer control step of transferring the print data received in the reception step to the printer by each first data size; and a detection step of detecting a disconnection between the server and the information processing apparatus, wherein in the transfer control step, when the disconnection is detected in the detection step, the print data is transferred to the printer by each second data size smaller than the first data size.

The present invention in its third aspect provides a non-transitory computer-readable storage medium storing a program for causing a computer to receive print data from a server which manages print data, transfer the received print data to a printer by each first data size, and when a disconnection from the server is detected, transfer the print data to the printer by each second data size smaller than the first data size.

The present invention can prevent generation of a print error when a disconnection of a network line is detected.

Further features of the present invention will become apparent from the following description of exemplary embodiments with reference to the attached drawings.

DESCRIPTION OF THE EMBODIMENTS

Figure 1:
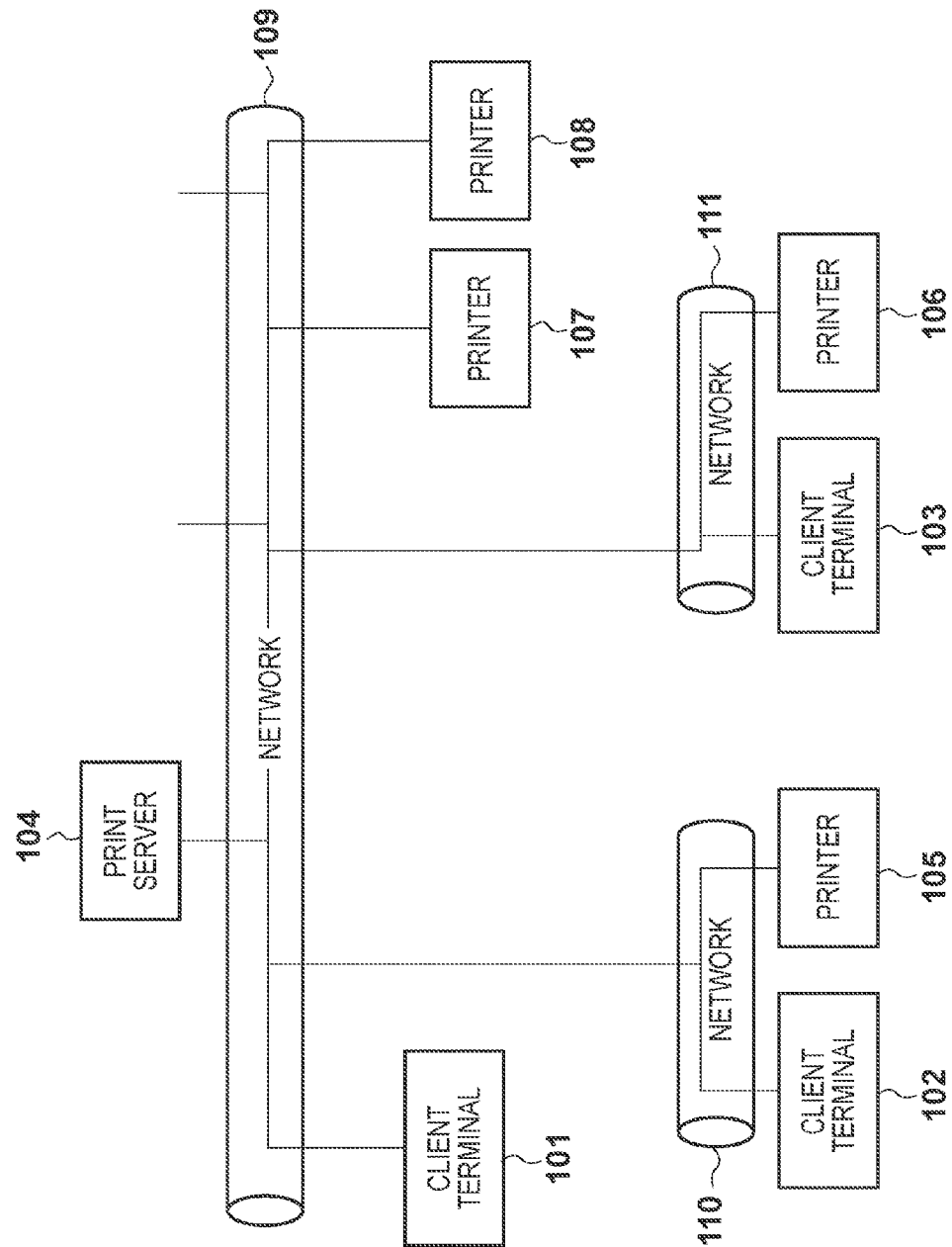
FIG. 1 is a block diagram showing the overall configuration of a printing system in the first embodiment.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

<First Embodiment>
<Overall System Configuration>

FIG. 1 is a block diagram showing the overall configuration of a printing system in an embodiment according to the present invention. As shown in FIG. 1, client terminals 101, 102, and 103, a print server 104, and printers 105, 106, 107, and 108 are connected via networks 109, 110, and 111. As shown in FIG. 1, the embodiment assumes that a plurality of client terminals and a plurality of printers are connected. The networks 109 to 111 are any of a LAN, a WAN, a telephone line, a dedicated digital line, an ATM, a frame relay line, a cable television line, a data broadcasting radio channel, and the like such as the Internet. The networks 109 to 111 may be implemented by a combination of them. The networks 109 to 111 suffice to send and receive data. Communication functions from the client terminals 101 to 103 to the print server 104 and the printers 105 to 108 may differ from those from the printers 105 to 108 to the print server 104. The client terminals 101 to 103 are formed from a desktop PC, notebook PC, mobile PC, PDA (Personal Data Assistant), and the like. The client terminals 101 to 103 may be cell phones incorporating a program execution environment. The client terminals 101 to 103 incorporate an environment where a program such as a Web browser (Internet browser, WWW browser, or browser for using World Wide Web) is executed. The print server 104 receives, from the Web browsers of the client terminals 101 to 103, information for identifying documents to be printed, and print requests to output destination printers. Then, the print server 104 sends back, to the Web browsers of the client terminals 101 to 103, response windows containing print commands for issuing print instructions. The Web browsers of the client terminals 101 to 103 issue the received print commands to designated printers. Upon receiving the print commands from the Web browsers of the client terminals 101 to 103, the printers 105 to 108 acquire document data to be printed from the print server 104, and print them.

<Hardware Configuration>

Figure 2:
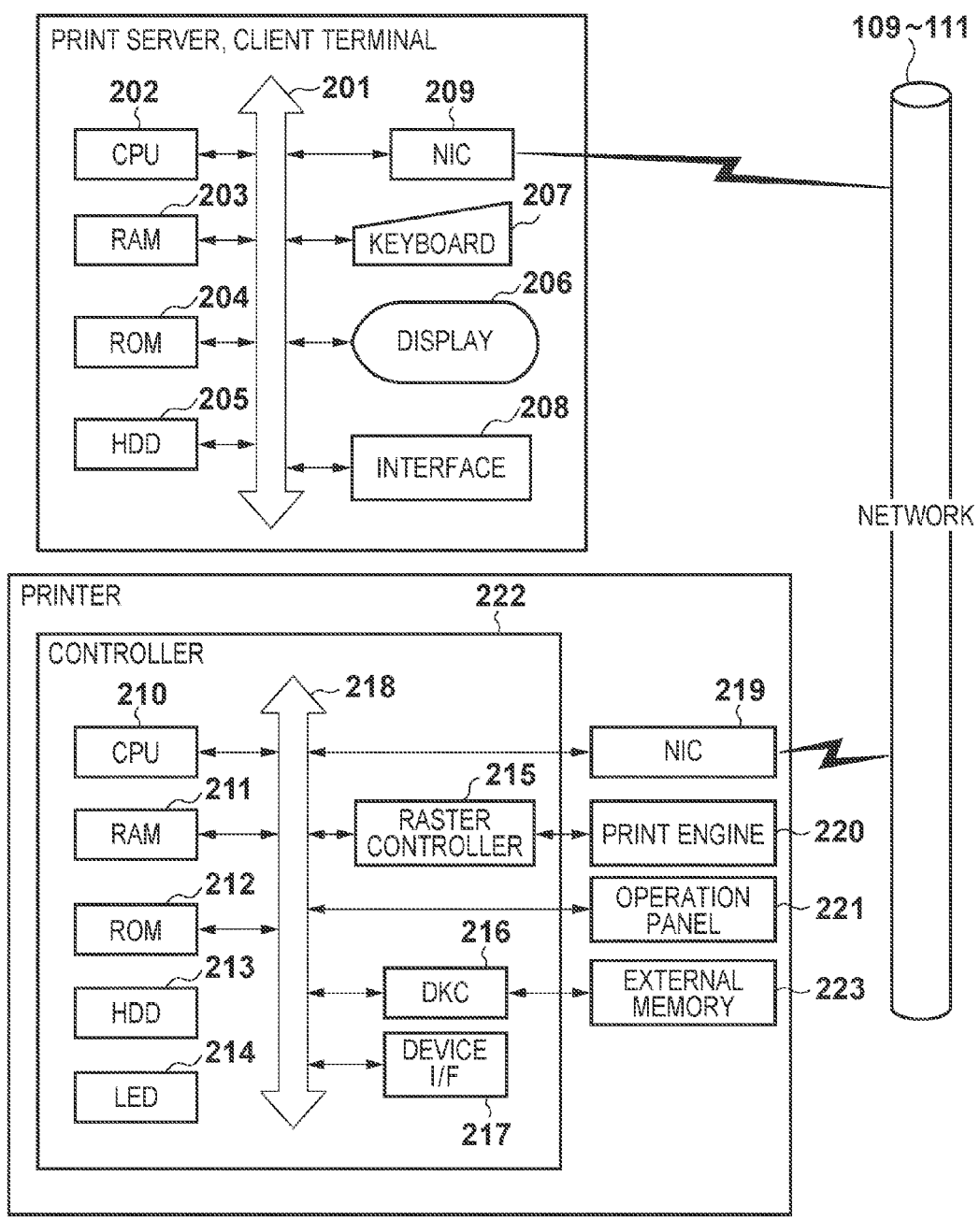
FIG. 2 is a block diagram showing the hardware configurations of a client terminal, print server, and printer.

FIG. 2 is a block diagram showing a hardware configuration common to the client terminals 101 to 103, the print server 104, and the printers 105 to 108. Referring to FIG. 2, a CPU 202 controls the whole apparatus. The CPU 202 controls to execute an application program, OS, and the like stored in a hard disk (HDD) 205 and temporarily store, in a RAM 203, information, files, and the like necessary to execute the programs. A ROM 204 stores programs such as a basic I/O program, and various data such as print data used for print processing and printer information. The RAM 203 functions as a main memory, work area, and the like for the CPU 202. The HDD 205 functions as a large-capacity memory, and stores application programs such as a Web browser, a print server program, an OS, related programs, and the like.

A display 206 displays a command input from a keyboard 207, a printer status, and the like. An interface (I/F) 208 is used to connect a printer, USB device, and peripheral device. The keyboard 207 is used when the user inputs an instruction. Data in the print server of the printing system is communicated via a system bus 201. A NIC (Network Interface Card) 209 exchanges data with an external apparatus via the I/F 208 and the networks 109 to 111. This configuration is merely an example, and the present invention is not limited to the configuration example shown in FIG. 2. For example, the storage destination of data and programs can be changed to the ROM, RAM, or HDD in accordance with their features.

A controller 222 in each of the printers 105 to 108 controls the printer. A CPU 210 controls the overall apparatus, and comprehensively controls accesses to various devices connected to a system bus 218. The control is based on a control program and the like which is stored in a ROM 212, or a control program, resource data (resource information), and the like which are stored in an external memory 223 connected via a disk controller (DKC 216). A RAM 211 functions as a main memory, work area, and the like for the CPU 210, and can expand the memory capacity by an optional RAM connected to an expansion port (not shown). An HDD 213 functions as a large-capacity memory, and stores a pull print application program, related programs, and the like. An operation panel 221 includes a user interface and pull print switching button for performing a pull print operation. The operation panel 221 also includes buttons and a display unit such as a liquid crystal panel or LED 214 for setting the operation mode of the corresponding one of the printers 105 to 108 and the like, displaying the operation status of the corresponding one of the printers 105 to 108, and performing an operation such as copy designation. A NIC (Network Interface Card) 219 exchanges data with an external apparatus. A print engine 220 shown in FIG. 2 adopts a known printing technique and copes with, for example, an electrophotographic method (laser beam method), inkjet method, and sublimation (thermal transfer) method. A raster controller 215 converts print data of the PDL language or PDF language into image data. A device interface (I/F) 217 is used to connect an external device via a USB or the like.

<Configuration of Printing System>

Figure 3:
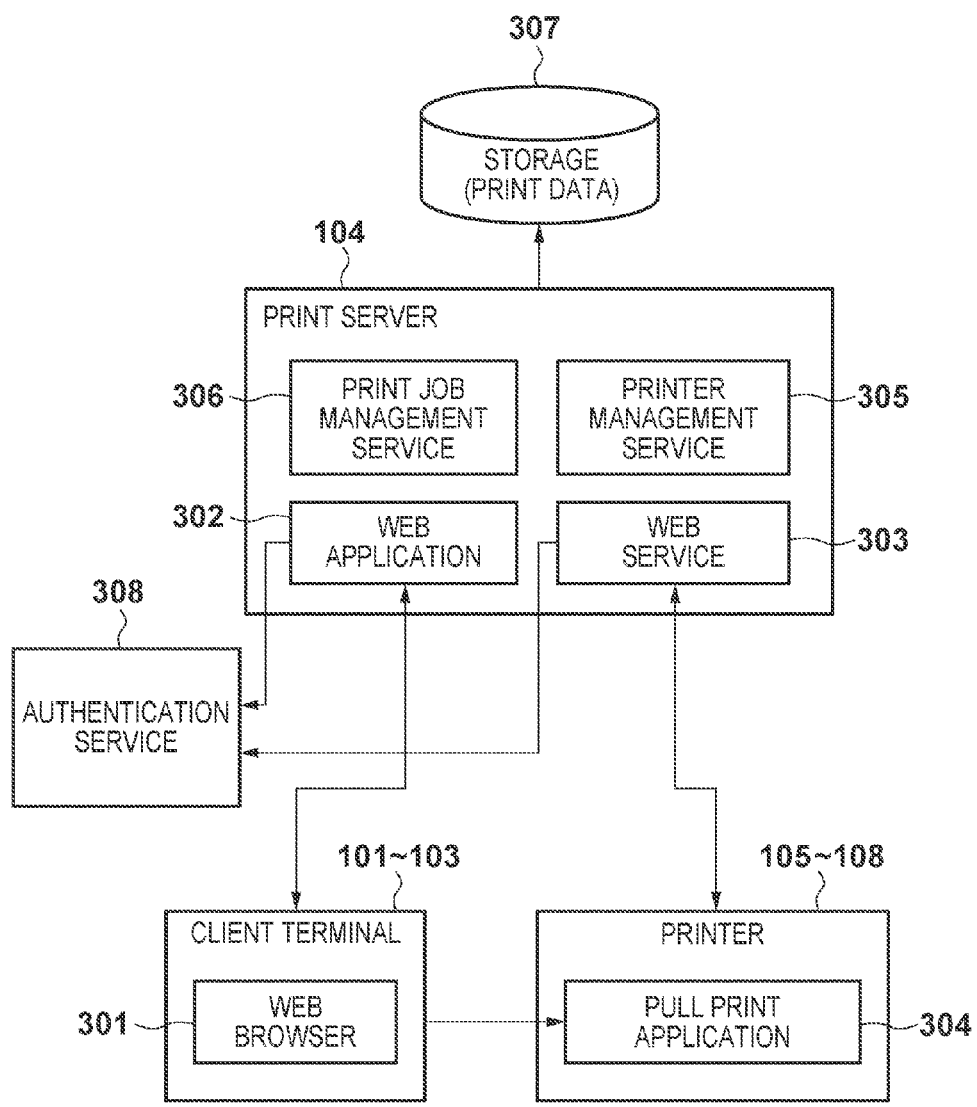
FIG. 3 is a block diagram showing the configuration of the printing system.

FIG. 3 is a block diagram showing the configuration of the printing system that pays attention to software. The print server 104 includes a print job management service 306 for managing a print job. The print job management service 306 manages, as print data in a storage 307, document data or the like input by another service or another program. The data format of the print data is, for example, PDL or PDF. The storage 307 is a storage device such as an HDD incorporated in the print server 104, an externally connected HDD, or a network storage.

A Web application 302 creates a Web page displayable on a Web browser 301 running on each of the client terminals 101 to 103, and sends back the created Web page in response to a request from the Web browser 301. In response to a print job acquisition request from a pull print application 304, a Web service 303 sends back print data and receives the status of a print job. The pull print application 304 in each of the printers 105 to 108 accepts a print request from the Web browser 301.

The print job management service 306, a printer management service 305, the Web application 302, and the Web service 303 are independent programs, and can be arranged in separate information processing apparatuses. In this case, the respective programs are installed in network-connected information processing apparatuses and communicate with each other. These programs may be installed in one information processing apparatus.

An authentication service 308 holds authentication information including the user name, password, and authentication token to access the print server 104. The authentication service 308 is an application implemented in an authentication server (not shown). Upon receiving a request from the Web browser 301 or pull print application 304, the corresponding Web application 302 or Web service 303 sends an authentication request to the authentication service 308. The authentication is performed by collating, with a user name and password held in the authentication service 308, a user name and password contained in a login request from a login Web page displayed on the Web browser 301. If the authentication is successful, the authentication service 308 issues an authentication token associated with an authenticated user. If necessary, the authentication token is issued to the print server 104, client terminals 101 to 103, and printers 105 to 108.

<Print Server>

Figure 4:
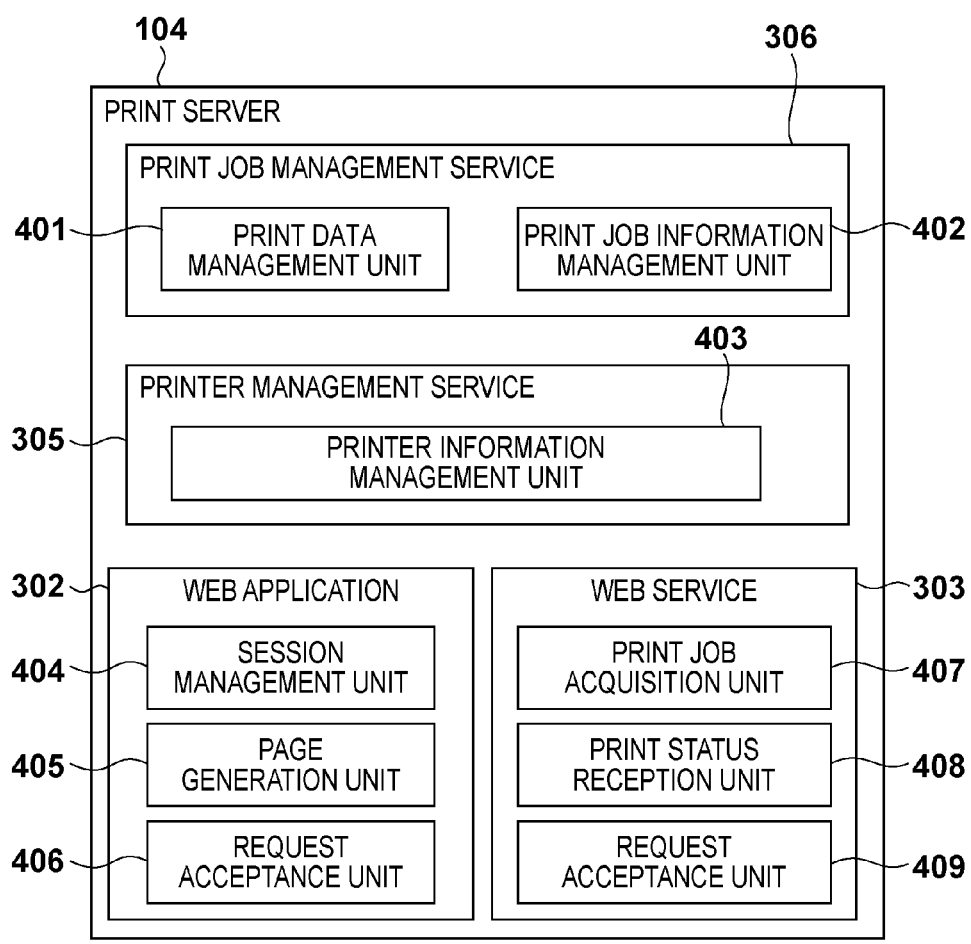
FIG. 4 is a block diagram showing the software configuration of the print server.

FIG. 4 is a block diagram showing the software configuration of the print server 104. Note that the software modules of the print server 104 are stored in the HDD 205 of the print server 104 shown in FIG. 2. As described above, these software modules are loaded into the RAM 203 and executed by the CPU 202. A print data management unit 401 in the print job management service 306 of the print server 104 manages print data. Upon receiving a print data acquisition request from the Web service 303, the print data management unit 401 acquires designated print data from the storage 307, and transfers it to the Web service 303. A print job information management unit 402 manages print job information of print data managed in the storage 307. The job information is formed from pieces of information such as the client job ID, device job ID, document name, job type, print status, acceptance date & time, final print date & time, user name, page count, page size, and print data link destination. The client job ID uniquely identifies a print job issued by the client. The device job ID is a job ID in a device that is issued by the pull print application 304. The job type indicates a data format such as PDL or PDF. The print status indicates statuses such as waiting, transferring, printing, normal end, and error end. The document name is a document name 502 in a document list window 500 shown in FIG. 5 (to be described later).

A printer information management unit 403 in the printer management service 305 manages printer information of the printers 105 to 108 managed by the print server 104. The printer information includes, for example, the printer name, MAC address, and URI. The printer name is information displayed on a printer name 512 of a printer list window 510 shown in FIG. 5 (to be described later) on the Web browser 301. The MAC address is information for uniquely identifying each printer. The URI is information serving as an end point at which the pull print application 304 accepts a print request.

Figure 5:
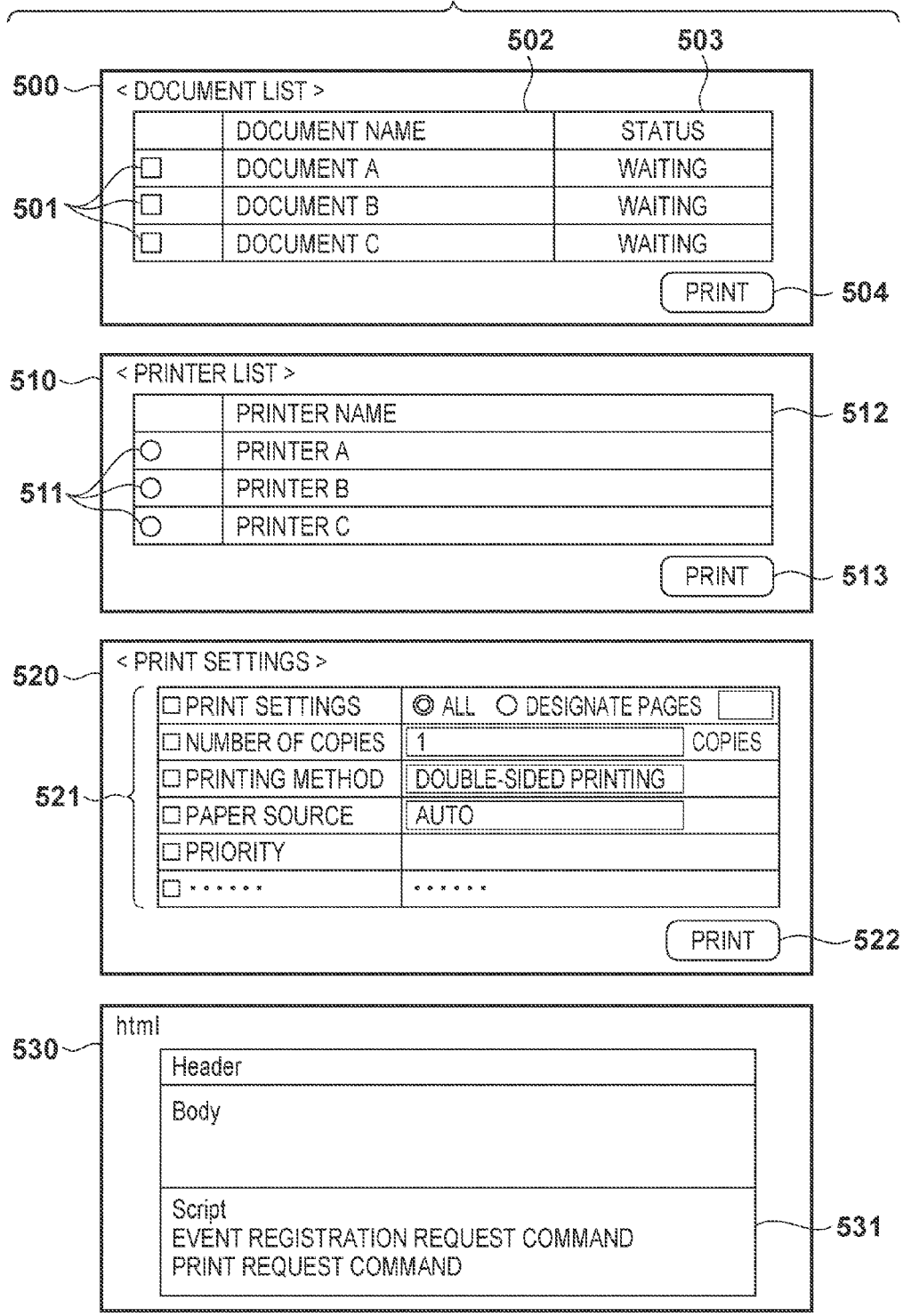
FIG. 5 is a view exemplifying Web windows displayed on the Web browser of the client terminal.

A session management unit 404 in the Web application 302 manages a request as a session from the Web browser 301 for which the authentication service 308 has established an authentication. A page generation unit 405 creates a Web window as shown in FIG. 5 (to be described later) in response to a request from the Web browser 301, and sends it back to the Web browser 301. A request acceptance unit 406 accepts an event registration request, print request, and the like from the Web browser 301.

A request acceptance unit 409 in the Web service 303 accepts a print data acquisition request and print job status from the pull print application 304. When the request acceptance unit 409 accepts a print data acquisition request, a print job acquisition unit 407 sends a print data acquisition request to the print job management service 306. When the request acceptance unit 409 accepts a print job status, a print status reception unit 408 notifies the print job management service 306 of the status. The print job management service 306 specifies the notified print job and updates the status.

<Web Window>

FIG. 5 is a view exemplifying Web windows which are created by the Web application 302 of the print server 104 and displayed on the Web browser 301 of each of the client terminals 101 to 103. When the Web browser 301 sends a job list request to the print server 104, the print server 104 creates the document list window 500 and sends it back to the Web browser 301. The document list window 500 includes job selection check boxes 501, the document name 502, a status 503, and a print button 504. The job selection check box 501 is used to select a job (document in this example) to be printed. When the Web browser 301 detects pressing of the print button 504, it transmits, to the print server 104, a list of documents selected by the job selection check boxes 501. Upon accepting the document list, the print server 104 creates the printer list window 510 and sends it back to the Web browser 301. The printer list window 510 includes printer selection radio buttons 511, the printer name 512, and a print button 513. When the Web browser 301 detects pressing of the print button 513, it transmits, to the print server 104, printer information selected by the printer selection radio button 511. Upon accepting the printer information, the print server 104 creates a print setting window 520 and sends it back to the Web browser 301. The print setting window 520 is used to set print attributes 521.

When the Web browser 301 detects pressing of a print button 522, it sends user-designated print attributes 521 to the print server 104. The print server 104 adds the designated print attribute information to print data. The print server 104 transmits, to the Web browser 301, a window 530 described by a script 531 for sending an event registration request and print request to a printer designated by the printer selection radio button 511. The window 530 is an example of the html structure of a window for an event registration request and print request. When the Web browser 301 has a Java®Script cross domain communication function or equivalent function, the script 531 is executed to send an event registration request and print request to the pull print application 304.

<Pull Print Application>

Figure 6:
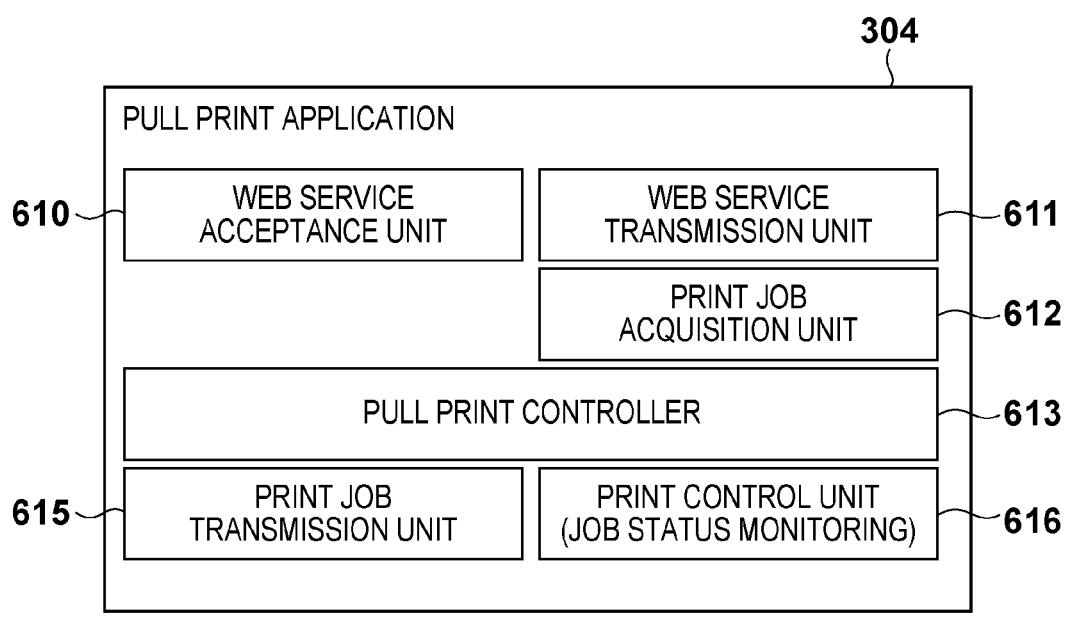
FIG. 6 is a block diagram showing the software configuration of a pull print application.
Figure 7:
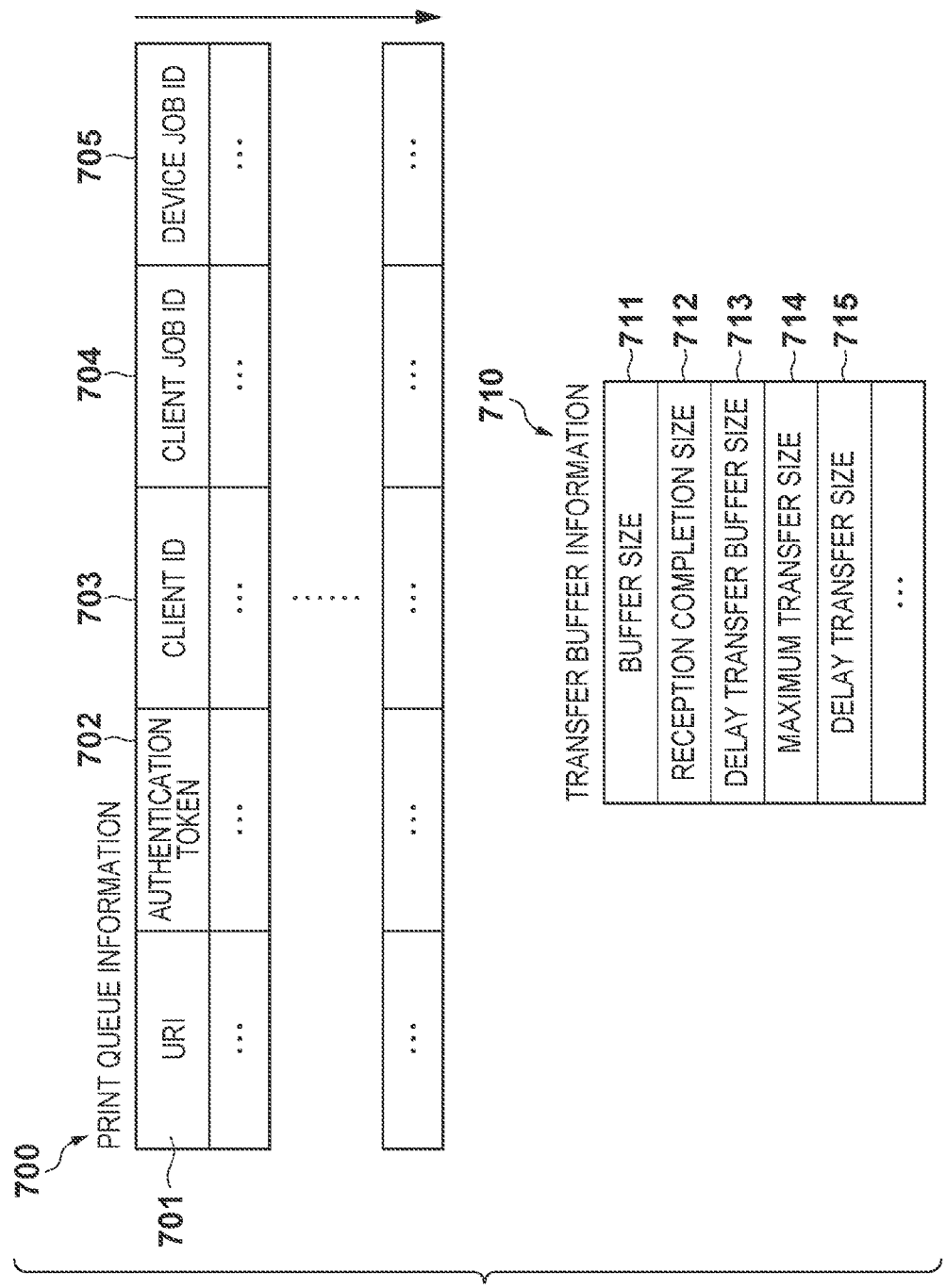
FIG. 7 is a view exemplifying print queue information and transfer buffer information.

FIG. 6 is a block diagram showing the software configuration of the pull print application 304. Note that the software modules of the pull print application 304 are stored in the HDD 213 of each of the printers 105 to 108. As described above, these software modules are loaded into the RAM 211 and executed by the CPU 210.

A Web service acceptance unit 610 in the pull print application 304 accepts an event registration request, print request, and the like from the Web browser 301. Upon receiving the event registration request, the Web service acceptance unit 610 notifies a print control unit 616 of event registration information. The event registration information includes the URI of an event transmission destination, and a client ID for identifying a client. Upon receiving the print request, the Web service acceptance unit 610 notifies a print job acquisition unit 612 of print request information. The print request information includes a URI 701 of a print data acquisition destination, an authentication token 702, a client ID 703, and a client job ID 704.

Upon receiving a print data acquisition request from the print job acquisition unit 612, a Web service transmission unit 611 acquires print data from the Web service 303, and transfers it to the print job acquisition unit 612. The Web service transmission unit 611 receives a status notification request from the print control unit 616, and notifies the Web service 303 of the status of the print job. The print job acquisition unit 612 manages acquisition of print data by print queue information 700.

The print queue information 700 includes queue information about a print job, including the URI 701, the authentication token 702, the client ID 703, the client job ID 704, and a device job ID 705. The URI 701 indicates a print data save destination. In the embodiment, for example, the URI of the Web service 303 is registered. The authentication service 308 issues the authentication token 702. The authentication token 702 is added to an acquired print job, and the authentication service 308 confirms matching in response to a request from the Web service 303.

The client ID 703 is used to identify a client. In the embodiment, for example, the URI of a Web service is registered as the client ID. The client job ID 704 is used to identify a job issued by the client. In the embodiment, for example, a UUID (Universally Unique Identifier) issued by the print server 104 is registered as the client job ID. The device job ID 705 is used to identify a job issued by the device. In the embodiment, for example, a value obtained by incrementing an integer starting from 1 by the pull print application 304 is registered in an order in which print requests have been accepted. The print job acquisition unit 612 registers, at the end of the print queue information 700, print request information notified from the Web service acceptance unit 610. The information transferred from the print request includes the URI 701, authentication token 702, client ID 703, and client job ID 704. The print job acquisition unit 612 acquires print data via the Web service transmission unit 611 from print job information at the start of the print queue information 700. In the embodiment, print data is acquired from the Web service 303 registered at the URI 701. The print job acquisition unit 612 sends the acquired print data to a print job transmission unit 615. A processing sequence when acquiring print data will be described later. A pull print controller 613 manages the overall operation of the pull print application 304. Operation instructions to the respective units and the like are issued via the pull print controller 613.

The print job transmission unit 615 accepts print data sent from the print job acquisition unit 612, and holds it in a transfer buffer. Then, the print job transmission unit 615 transmits the print data saved in the transfer buffer to the controller 222 to perform print processing. When saving print data in the transfer buffer, the print data is transferred to the controller 222 while receiving the print data. Therefore, the transfer buffer saves part of the print data. The print job transmission unit 615 holds transfer buffer information 710, and transfer of print data is controlled based on the transfer buffer information 710.

The transfer buffer information 710 includes a buffer size 711, reception completion size 712, delay transfer buffer size 713, maximum transfer size 714, and delay transfer size 715. The buffer size 711 is the size of the transfer buffer held in the print job transmission unit 615. The reception completion size 712 is the size of accumulated data which has already been received and saved in the transfer buffer. The delay transfer buffer size 713 is the threshold of a buffer size for starting delay transfer to the controller 222. The maximum transfer size 714 is a transfer size (example of the first data size) to the controller 222. The delay transfer size 715 is a transfer size (example of the second data size) smaller than the maximum transfer size in delay transfer. The delay transfer is transfer control performed to change print data from the maximum transfer size 714 to a smaller size so as to prolong the time of transfer to the controller 222 and prevent a timeout when transferring print data to the controller 222. A print data transfer processing control sequence using the transfer buffer information 710 will be described later.

The print control unit 616 holds event registration information notified from the Web service acceptance unit 610. The event registration information holds the URI of an event transmission destination, a client ID for identifying a client, and the like. The print control unit 616 receives, from the controller 222, the status of a print job which has been transferred from the print job transmission unit 615 to the controller 222. The print control unit 616 notifies the event transmission destination URL via the Web service transmission unit 611 of the print job status. In the embodiment, the event transmission destination URL is, for example, the Web service 303. Since the print job status notification includes a client job ID and a device job ID, the print server 104 can specify a print job.

<Pull Print Sequence>

Figure 8:
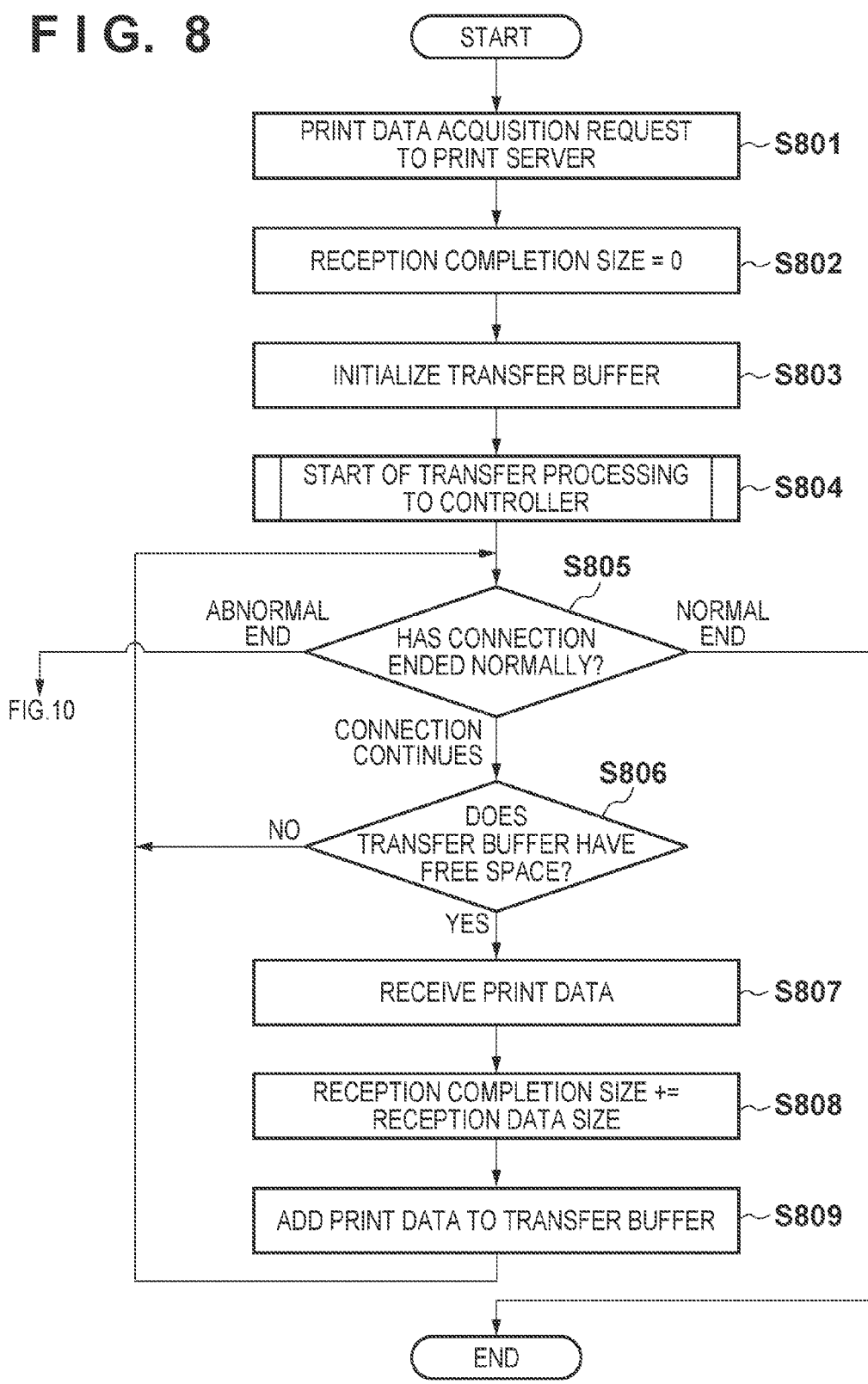
FIG. 8 is a flowchart showing a sequence to acquire print data and process it by the printer.

FIG. 8 is a flowchart showing a print data processing sequence to acquire print data by the pull print application 304 from the print server 104 and process it. The processing shown in FIG. 8 is executed by loading a program stored in the HDD 213 of the printer shown in FIG. 2 into the RAM 211 of the printer and executing it by the CPU 210 of the printer. The printer 105 will be explained as an example of the printer.

In step S801, the pull print application 304 issues a print data acquisition request to the print server 104. At this time, the print data acquisition request is executed sequentially from the start of the print queue information 700. In step S802, the pull print application 304 sets "0" in the reception completion size 712 of the transfer buffer information 710 held in the print job transmission unit 615 of the printer 105. In step S803, the pull print application 304 initializes the transfer buffer information 710. In step S804, the pull print application 304 starts print data transfer processing to the controller 222 of the printer 105. The processing in step S804 will be described later with reference to FIG. 9. The print data transfer processing to the controller 222 which has started in step S804 continues even during processes in step S805 and subsequent steps.

In step S805, the pull print application 304 determines whether a connection to the print server 104 has ended normally, abnormally (disconnection) or if the connection still continues. Processing when it is determined that a connection to the print server 104 has ended abnormally will be described later with reference to FIG. 10. In the embodiment, whether a connection to the print server 104 has ended normally or abnormally is determined by, for example, determining whether end processing of the TCP/IP communication protocol has been performed normally. If the pull print application 304 determines in step S805 that a connection to the print server 104 has ended normally, it determines that reception of all print data is completed, and ends the process. If the pull print application 304 determines in step S805 that a connection to the print server 104 continues, it advances to step S806.

In step S806, the pull print application 304 determines, from the buffer size 711 and reception completion size 712 of the transfer buffer information 710, whether the transfer buffer has a free space. The determination processing in step S806 is performed by, for example, comparing the buffer size 711 with the reception completion size 712. If the reception completion size 712 becomes larger than the buffer size 711 upon receiving print data, the pull print application 304 determines that the transfer buffer has no free space, and it returns the process to step S805. If the reception completion size 712 remains smaller than the buffer size 711 even upon receiving print data, the pull print application 304 determines that the transfer buffer has a free space, and advances to step S807.

In step S807, the printer 105 receives print data from the print server 104. In step S808, the pull print application 304 adds the size of the print data received in step S807 to the reception completion size 712. In step S809, the pull print application 304 adds the print data received in step S807 to the transfer buffer. After that, the pull print application 304 returns the process to step S805.

As described above, the printer 105 in the embodiment transfers print data saved in the transfer buffer to the controller 222 of the printer 105 while receiving print data from the print server 104, as shown in FIG. 8.

Figure 9:
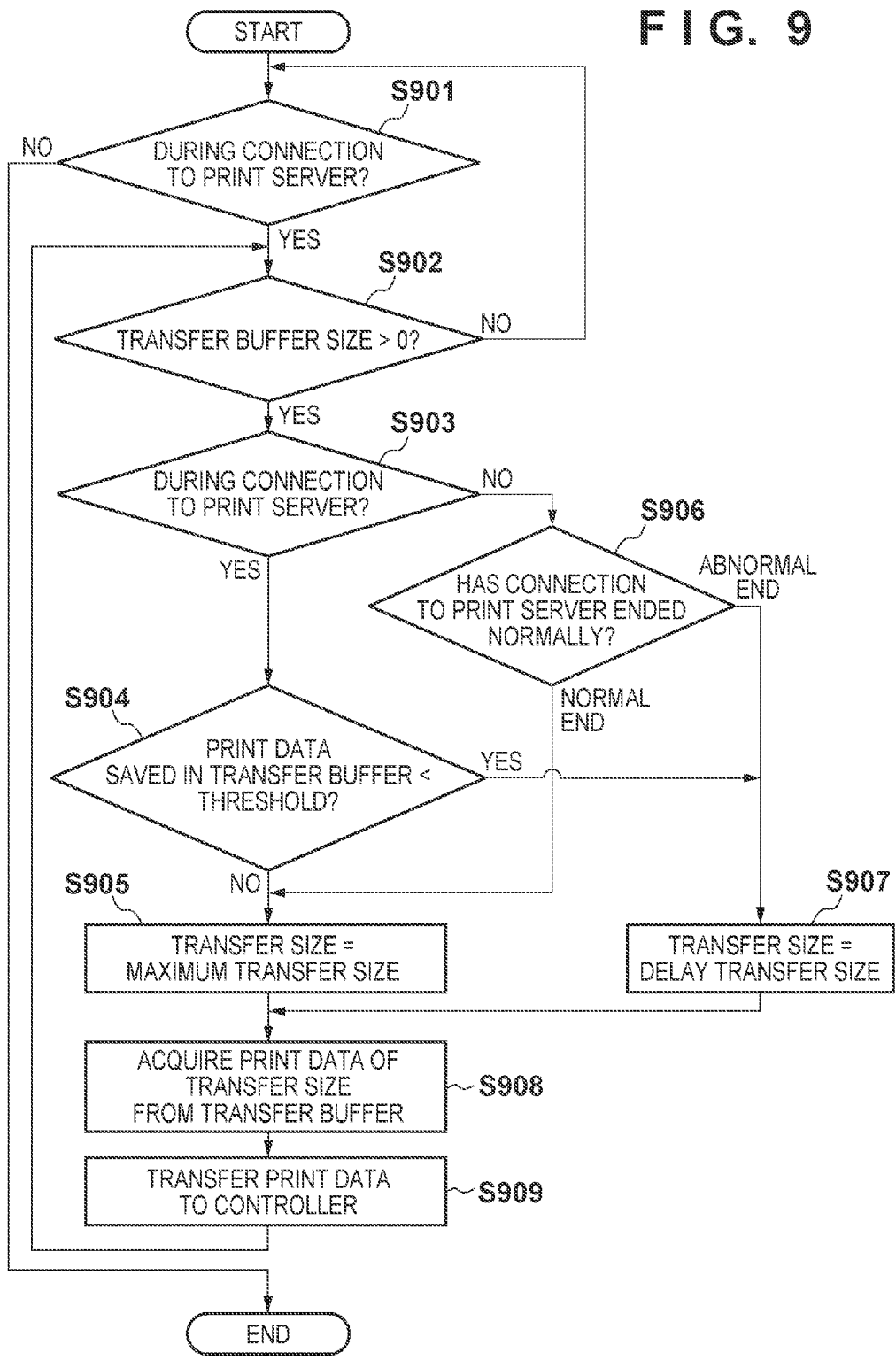
FIG. 9 is a flowchart showing a sequence to control transfer processing to a controller.

FIG. 9 is a flowchart showing the processing sequence in step S804 of FIG. 8. The processing shown in FIG. 9 is executed by loading a program stored in the HDD 213 of the printer shown in FIG. 2 into the RAM 211 of the printer and executing it by the CPU 210 of the printer.

In step S901, the pull print application 304 determines whether the printer 105 is connected to the print server 104. If the pull print application 304 determines that the printer 105 is not connected to the print server 104, it ends the process. If the pull print application 304 determines that the printer 105 is connected to the print server 104, it advances to step S902. In step S902, the pull print application 304 determines whether data to be transferred to the transfer buffer is saved. In the processing of step S902, for example, it may be determined whether the reception completion size 712 of the transfer buffer information 710 is larger than 0. If the pull print application 304 determines that data to be transferred to the transfer buffer is not saved, it returns the process to step S901. If the pull print application 304 determines that data to be transferred to the transfer buffer is saved, it advances to step S903.

In step S903, the pull print application 304 determines whether the connection to the print server 104 in step S801 continues. If the pull print application 304 determines that the connection to the print server 104 continues, it advances to step S904. If the pull print application 304 determines that the connection to the print server 104 does not continue, it advances to step S906.

In step S904, the pull print application 304 determines whether print data which is saved in the transfer buffer and is to be transferred is smaller than a reference threshold. In the embodiment, for example, it is determined whether the reception completion size 712 is smaller than the delay transfer buffer size 713. If the pull print application 304 determines that print data to be transferred is smaller than the reference threshold, it advances to step S905 to determine the maximum transfer size 714 as the size of transfer to the controller 222. If the pull print application 304 determines that print data to be transferred is equal to or larger than the reference threshold, it advances to step S907 to determine the delay transfer size 715 as the size of transfer to the controller 222.

Referring back to step S903, if the pull print application 304 determines in step S903 that the connection to the print server 104 does not continue, it determines in step S906 whether the connection to the print server 104 has ended normally or abnormally. The determination in step S906 may be made by, for example, determining whether end processing of the TCP/IP communication protocol has been performed normally. If the pull print application 304 determines in step S906 that the connection to the print server 104 has ended normally, it performs the processing described in step S905. If the pull print application 304 determines that the connection to the print server 104 has ended abnormally, it performs the processing described in step S907.

After determining the size of transfer from the transfer buffer to the controller 222 in step S905 or S907, the pull print application 304 acquires print data of the transfer size determined in step S905 or S907 from the transfer buffer in step S908. In step S909, the pull print application 304 transfers the acquired print data of the size of transfer to the controller 222 (step S909). After the end of the transfer processing in step S902, the pull print application 304 returns the process to step S902.

As described above, according to the embodiment, if a connection from the printer 105 to the print server 104 ends during transfer processing (step S804) to the controller 222, the end of the connection is detected (step S903). Further, it is determined whether the connection has ended normally upon completion of receiving print data or abnormally due to a line disconnection or the like (step S906). That is, in the embodiment, when the connection to the print server 104 ends abnormally during transfer processing to the controller, the size of transfer data to the controller 222 is decreased till the start of connection retry processing (to be described later). This can prevent generation of a time-out in transfer processing to the controller 222. In the embodiment, even when a connection from the printer 105 to the print server 104 continues, if it is determined in step S904 that the amount of print data saved in the transfer buffer is smaller than the threshold, the size of transfer data to the controller 222 is decreased. Thus, generation of a time-out in transfer processing to the controller 222 can be prevented even when the reception rate of print data from the print server 104 decreases due to a line trouble or the like and the amount of data to be transferred decreases.

Figure 10:
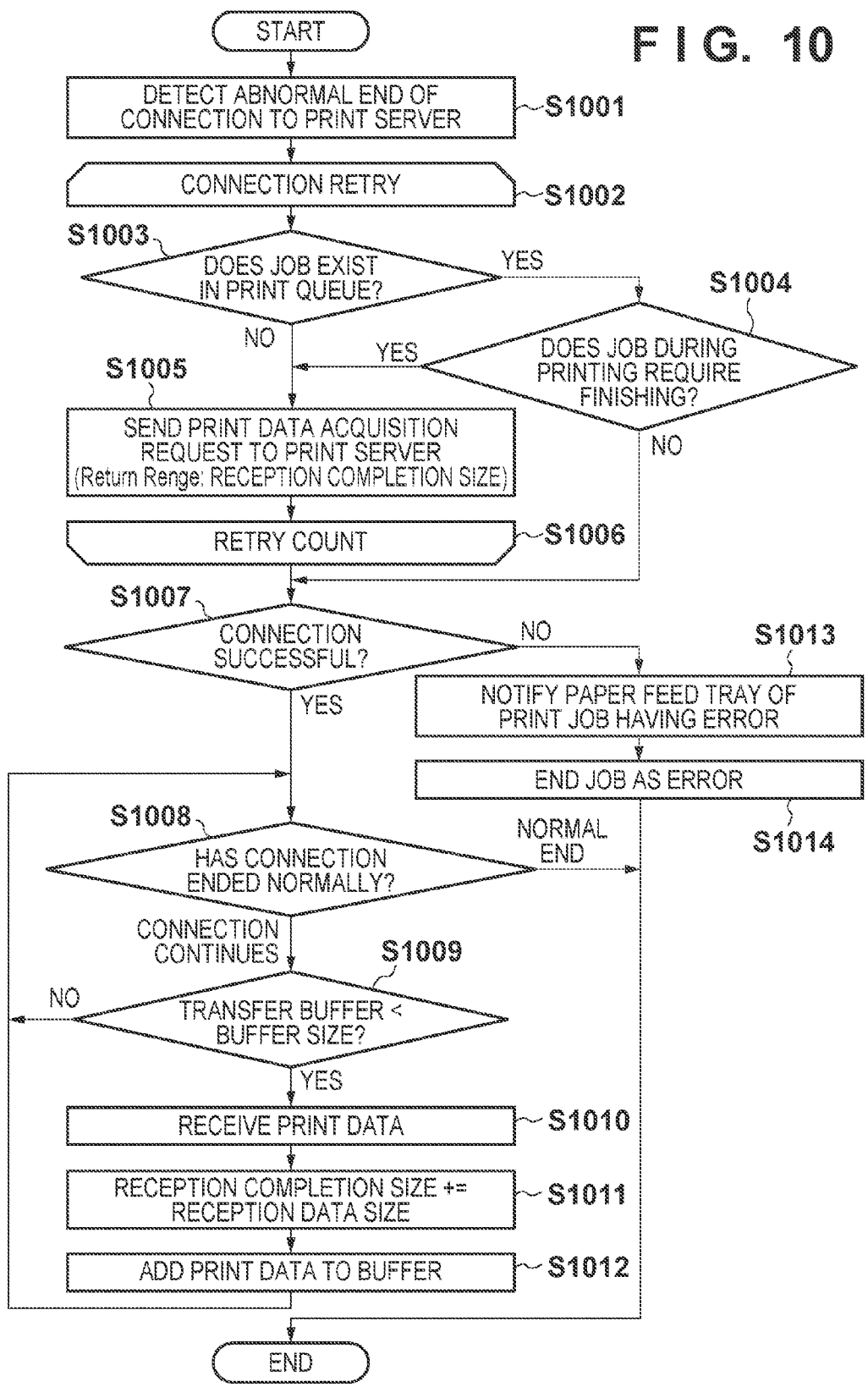
FIG. 10 is a flowchart showing a processing sequence executed when it is determined that a connection to the print server has ended abnormally.

FIG. 10 is a flowchart showing a processing sequence executed when the pull print application 304 determines in step S805 of FIG. 8 that a connection to the print server 104 has ended abnormally. The processing shown in FIG. 10 is executed by loading a program stored in the HDD 213 of the printer shown in FIG. 2 into the RAM 211 of the printer and executing it by the CPU 210 of the printer.

In step S1001, the pull print application 304 detects the abnormal end of a connection to the print server 104. In the embodiment, for example, the end of a connection without normally performing end processing of the TCP/IP communication protocol is detected as an abnormal end. If the pull print application 304 determines that the connection to the print server 104 has ended abnormally, it retries a connection to the print server 104 in steps S1002 to S1006. The pull print application 304 holds the retry count and retry interval as initial values. The retry count and retry interval may be changeable in accordance with the network environment.

In the embodiment, when performing retry processing, first in step S1003, the pull print application 304 refers to the print queue information 700 to determine whether a print job has been registered subsequently to a job during execution of pull print. If the pull print application 304 determines that a print job has been registered subsequently, it advances to step S1004. In step S1004, the pull print application 304 acquires print job information during printing from the controller 222 and refers to it. The pull print application 304 may acquire print job information from the print server 104. In step S1004, the pull print application 304 determines whether the print job during printing has a finishing setting such as stapling or bookbinding. If the pull print application 304 determines that the print job during printing has a finishing setting, it advances to step S1005 and sends a print data acquisition request to the print server 104 to retry a connection. In step S1005, the pull print application 304 notifies the print server 104 of the reception completion size 712. Upon receiving the reception completion size 712, the print server 104 sends back, as a response to the printer 105, print data subsequent to the reception completion size 712 out of print data. If the pull print application 304 determines in step S1004 that the print job during printing has no finishing setting, it advances to step S1007 without a retry.

Referring back to step S1003, if the pull print application 304 determines in step S1003 that no print job has been registered subsequently, it performs the processing described in step S1005. More specifically, if the print job during printing has a finishing setting, the pull print application 304 retries a connection without interrupting printing. This is because if a print error occurs in a print job having a finishing setting, re-printing needs to be executed from the first page.

In the embodiment, when a print job exists subsequently and the print job during printing has a finishing setting, a connection is retried (and the transfer size is set small in the processing of step S907). This can prevent re-printing from the first page due to a print error. If the print job during printing has no finishing setting, the print job ends as an error without a connection retry (step S1014 to be described later). Also, if a print job exists subsequently and the print job during printing has no finishing setting, the print job ends as an error without a connection retry (step S1014 to be described later).

In step S1007, the pull print application 304 determines whether a reconnection to the print server 104 is successful. If the pull print application 304 determines that a reconnection to the print server 104 has failed, it notifies the print server 104 in step S1013 of information about a discharge tray used in printing of the print job having the print error. The discharge tray information for use is acquired from the controller 222. In the embodiment, the print server 104 accepts discharge tray information corresponding to the print error, and can change queued discharge tray information to a discharge tray different from the discharge tray corresponding to the print error. That is, the discharge destination can be switched between the print job having the print error and a subsequent print job. This can prevent mixing of output materials by the print job which has discharged sheets midway due to the print error, and those by a subsequent print job. In step S1014, the pull print application 304 ends data transfer of print data during printing, and notifies the print server 104 of a status indicating that the print job has ended due to an error.

If the pull print application 304 determines in step S1007 that a reconnection to the print server 104 is successful, it receives print data in processes of steps S1008, S1009, S1010, S1011, and S1012. A description of the processes in steps S1008 to S1012 is the same as that of the processes in steps S805 to S809 of FIG. 8.

In the embodiment, when a connection to the print server 104 ends abnormally, the size of transfer to the controller 222 is changed to the delay transfer size 715 (set as small as possible) to decrease the transfer rate, maintaining the connection to the controller 222. While maintaining the connection to the controller 222, a connection to the print server 104 is retried. If a reconnection is successful, subsequent print data can be transferred to the controller 222. The controller 222 can receive successively transferred print data regardless of the abnormal end of a connection to the print server 104 or a retry. Thus, the print job can continue printing without generating an error due to a time-out. The print server 104 and pull print application 304 are sometimes connected to different ones of the networks 109 to 111. In this case, the print data acquisition rate from the print server 104 decreases, the print data transfer rate to the controller 222 increases, and no print data remains in the transfer buffer, generating a print error. According to the present invention, when the transfer buffer size becomes small, the size of transfer to the controller 222 is changed to the delay transfer size 715 to decrease the transfer rate. This can prevent generation of a print error while maintaining the transfer buffer.

<Second Embodiment>

A case in which the pull print application 304 in the first embodiment is arranged as a server separately from printers 105 to 108 will be explained as the second embodiment.

<Overall System Configuration>

Figure 11:
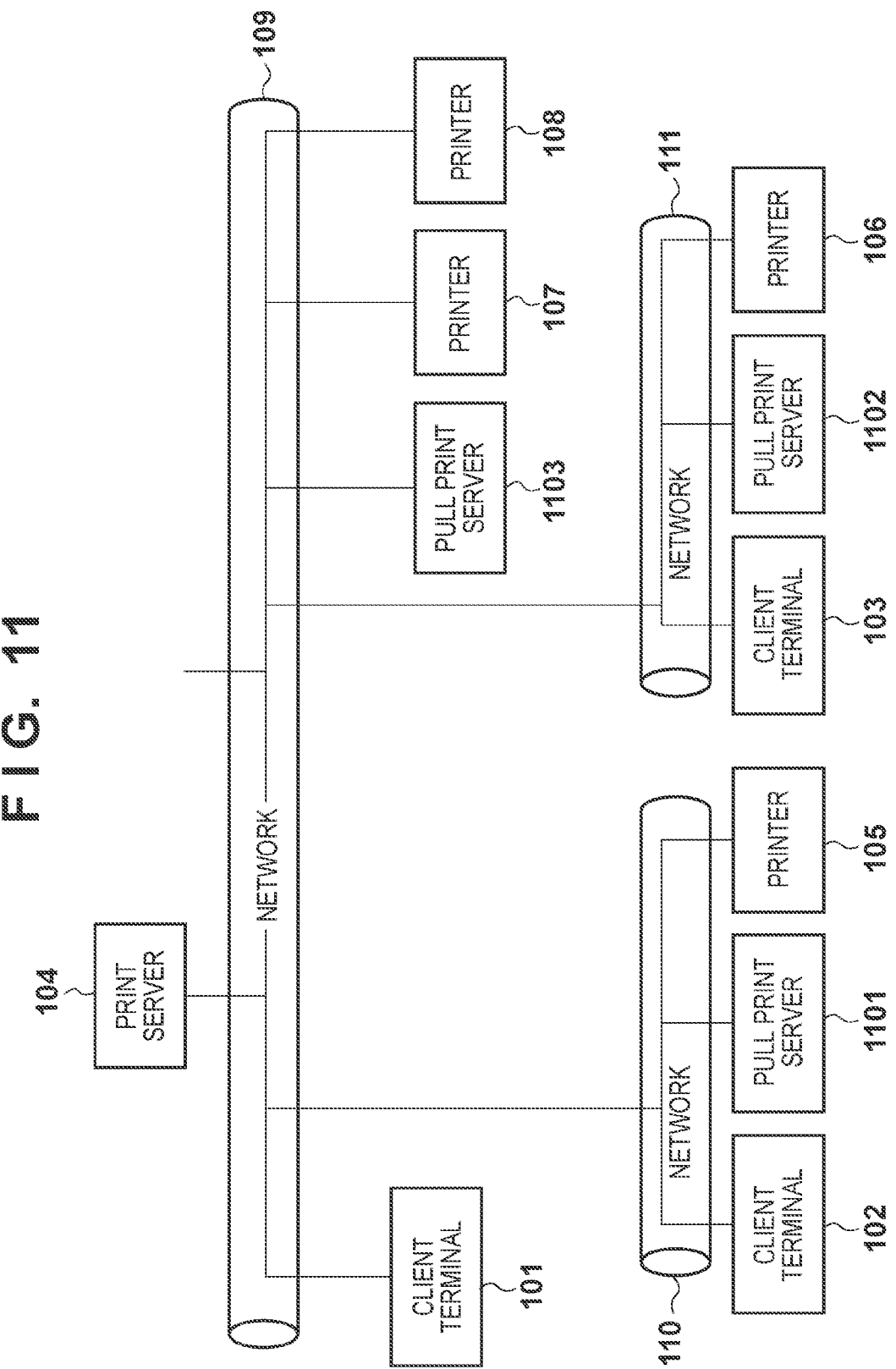
FIG. 11 is a block diagram showing the overall configuration of a printing system in the second embodiment.

FIG. 11 is a block diagram showing the overall configuration of a printing system in the second embodiment. Pull print servers 1101 to 1103 perform pull print to one or a plurality of printers 105 to 108. The printers 105 to 108 for which the pull print servers 1101 to 1103 perform pull print are connected as network segments accessible by the corresponding pull print servers 1101 to 1103. For example, networks 110 and 111 are separate segments, and the pull print server 1101 cannot be connected to the printer 106 and thus cannot perform pull print. To the contrary, the printer 105 belongs to the same network as that of the pull print server 1101, so the pull print server 1101 can be connected to it and perform pull print. The pull print servers 1101 to 1103 will be generically called a pull print server 1100 as long as they need not be discriminated.

<Hardware Configuration>

Figure 12:
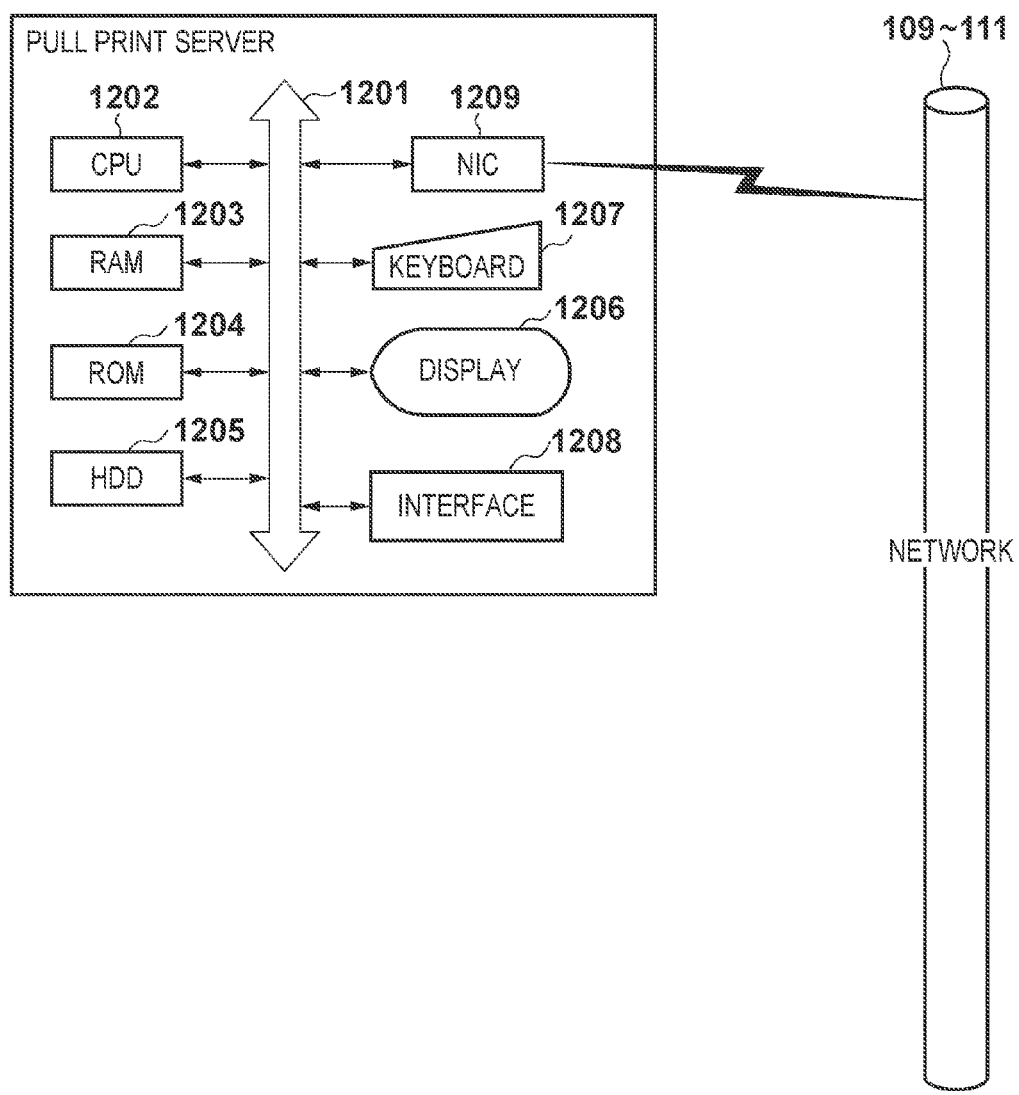
FIG. 12 is a block diagram showing the hardware configuration of a pull print server.

FIG. 12 is a block diagram showing the hardware configuration of the pull print server 1100 in the printing system. A description of a system bus 1201 to an interface 1209 is the same as that of the system bus 201 to the interface 209 in FIG. 2.

<Configuration of Printing System>

Figure 13:
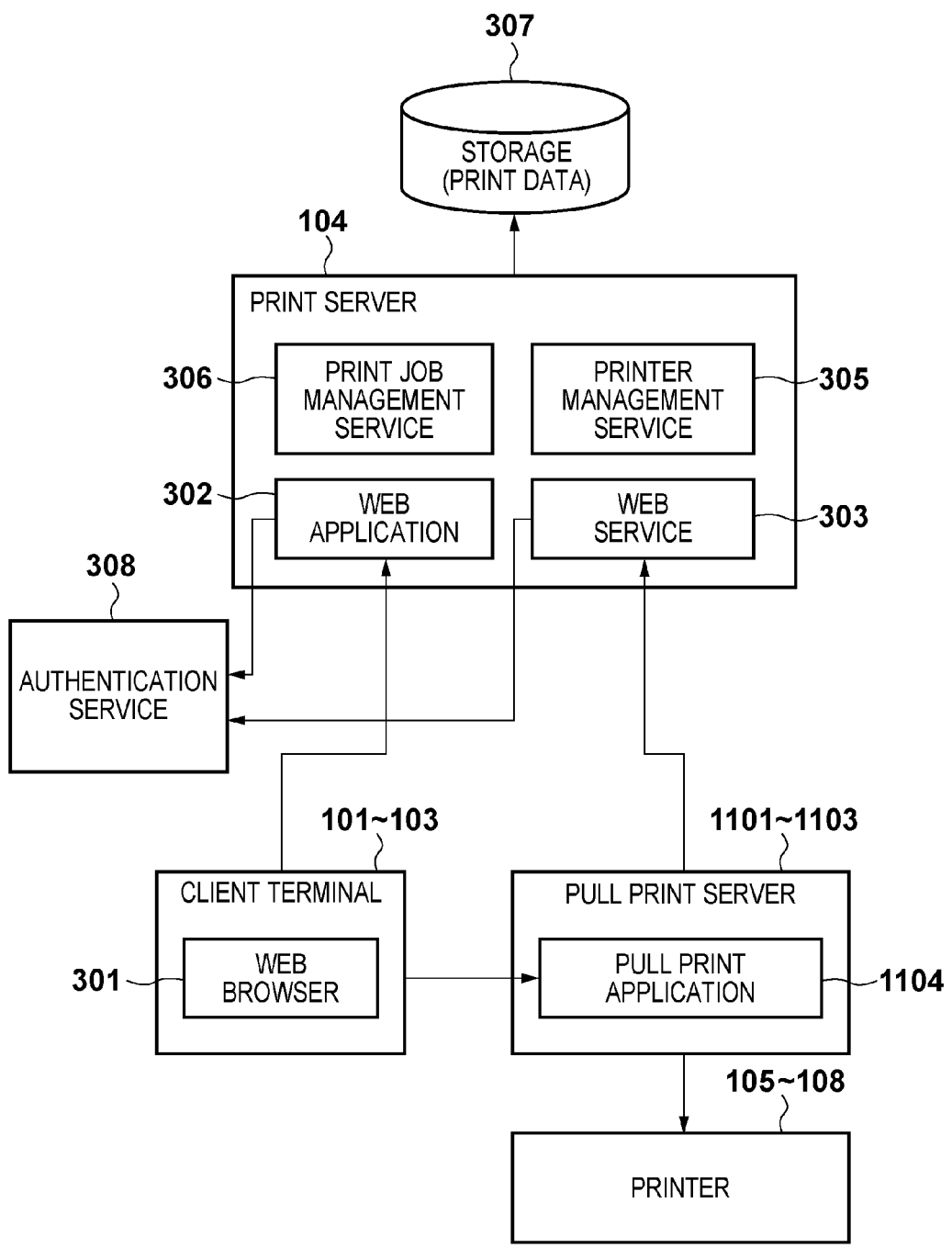
FIG. 13 is a block diagram showing the configuration of the printing system.

FIG. 13 is a block diagram showing the configuration of the printing system in the second embodiment. A pull print application 1104 running on each of the pull print servers 1101 to 1103 corresponds to the pull print application 304 in the first embodiment. The pull print servers 1101 to 1103 execute pull print by accepting print requests from Web browsers 301, acquiring print data from a print server 104, and transferring them to the printers 105 to 108.

<Pull Print Application 1104>

The software configuration of the pull print application 1104 is the same as that of the pull print application 304 shown in FIG. 6. The software modules of the pull print application 1104 are stored in the HDD 1205 shown in FIG. 12, loaded into the RAM 1203, and executed by the CPU 1202.

A difference between the pull print application 304 in the first embodiment and the pull print application 1104 in the second embodiment will be explained. First, the pull print application 1104 can execute pull print to a plurality of printers. Pull print to a plurality of printers is implemented by setting a URI as an end point for accepting an event registration request command and print request for each printer, managing information such as print queue information 700 for each printer, and performing transfer processing. The print server 104 holds, as printer information, the end point URI which differs between printers, and need not be aware of which of the printers 105 to 108 and the pull print server 1100 is the connection destination. The pull print server 1100 is connected to the printers 105 to 108 via networks. Hence, print data is transferred to controllers 222 of the printers 105 to 108 via networks 109 to 111.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-244288, filed Oct. 29, 2010, which is hereby incorporated by reference herein in its entirety.

What is claimed is:

1. An information processing apparatus connectable to a server which manages print data, and a printer which prints based on the print data, comprising:
   a reception unit configured to receive the print data from the server;
   a transfer control unit configured to transfer the print data received by said reception unit to the printer by each first data size;
   a detection unit configured to detect a disconnection between the server and the information processing apparatus;
   a reconnection unit configured to perform a reconnection between the server and the information processing apparatus when said detection unit detects the disconnection; and
   a request unit configured to request the server to transmit, to the information processing apparatus, print data subsequent to the print data which has been received by said reception unit until the disconnection is detected,
   wherein when said detection unit detects the disconnection, said transfer control unit transfers the print data to the printer by each second data size smaller than the first data size.

2. The apparatus according to claim 1, further comprising a determination unit configured to determine whether a size of the print data received by said reception unit is smaller than a threshold,
   wherein when said determination unit determines that the size of the print data received by said reception unit is smaller than the threshold, said transfer control unit transfers the print data to the printer by each second data size.

3. The apparatus according to claim 1, wherein the print data has a finishing setting.

4. A print data processing method executed in an information processing apparatus connectable to a server which manages print data, and a printer which prints based on the print data, comprising:
   a reception step of receiving the print data from the server;
   a transfer control step of transferring the print data received in the reception step to the printer by each first data size;
   a detection step of detecting a disconnection between the server and the information processing apparatus;
   a reconnection step of performing a reconnection between the server and the information processing apparatus when the detection step detects the disconnection; and
   a request step of requesting the server to transmit, to the information processing apparatus, print data subsequent to the print data which has been received in the reception step until the disconnection is detected,
   wherein in the transfer control step, when the disconnection is detected in the detection step, the print data is transferred to the printer by each second data size smaller than the first data size.

5. A non-transitory computer-readable storage medium storing a program for causing a computer to
   receive print data from a server which manages print data,
   transfer the received print data to a printer by each first data size,
   detect a disconnection between the server and the computer,
   perform a reconnection between the server and the computer when the disconnection is detected, and
   request the server to transmit, to the computer, print data subsequent to the print data which has been received until the disconnection is detected,
   when the disconnection from the server is detected, transfer the print data to the printer by each second data size smaller than the first data size.

6. The method according to claim 4, further comprising a determination step of determining whether a size of the print data received in the reception step is smaller than a threshold,
   wherein when the determination step determines that the size of the print data received in the reception step is smaller than the threshold, the transfer control step transfers the print data to the printer by each second data size.

7. The method according to claim 4, wherein the print data has a finishing setting.

* * * * *